US010434708B2

United States Patent
Tom et al.

(10) Patent No.: US 10,434,708 B2
(45) Date of Patent: Oct. 8, 2019

(54) THREE-DIMENSIONAL (3D) PRINTING METHOD

(71) Applicant: Hewlett-Packard Development Company, L.P., Houston, TX (US)

(72) Inventors: Howard S. Tom, San Jose, CA (US); Hou T. Ng, Campbell, CA (US); Lihua Zhao, Sunnyvale, CA (US); Sivapackia Ganapathiappan, Los Altos, CA (US); Krzysztof Nauka, Palo Alto, CA (US); Yan Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 232 days.

(21) Appl. No.: 15/121,730

(22) PCT Filed: Apr. 30, 2014

(86) PCT No.: PCT/US2014/036169
§ 371 (c)(1),
(2) Date: Aug. 25, 2016

(87) PCT Pub. No.: WO2015/167530
PCT Pub. Date: Nov. 5, 2015

(65) Prior Publication Data
US 2017/0225396 A1 Aug. 10, 2017

(51) Int. Cl.
*B29C 67/04* (2017.01)
*B33Y 10/00* (2015.01)
(Continued)

(52) U.S. Cl.
CPC ............ *B29C 64/165* (2017.08); *B33Y 10/00* (2014.12); *B33Y 30/00* (2014.12); *B33Y 70/00* (2014.12);
(Continued)

(58) Field of Classification Search
CPC .............. B29C 64/165; B29C 67/0081; B29K 2105/0005; B29K 2105/0011; B29K 2105/251; B33Y 10/00; B33Y 70/00
(Continued)

(56) References Cited

U.S. PATENT DOCUMENTS

| | | | |
|---|---|---|---|
| 5,015,676 A * | 5/1991 | Macholdt | C09D 5/034 523/453 |
| 7,258,736 B2 | 8/2007 | Oriakhi et al. | |

(Continued)

FOREIGN PATENT DOCUMENTS

| | | |
|---|---|---|
| CN | 100564007 | 12/2009 |
| DE | 29824448 | 6/2001 |

(Continued)

OTHER PUBLICATIONS

International Search Report and Written Opinion for International Application No. PCT/US2014/036169 dated Feb. 4, 2016, 10 pages.

*Primary Examiner* — Alexander M Weddle
(74) *Attorney, Agent, or Firm* — Dierker & Kavanaugh PC

(57) ABSTRACT

In a 3D printing method, a sinterable material is applied and heated to a temperature ranging from about 50° C. to about 400° C. A coalescent agent is selectively applied on a portion of the sinterable material, and a modifying agent is selectively applied on the portion and/or on another portion of the sinterable material. The modifying agent consists of an inorganic salt, a surfactant, a co-solvent, a humectant, a biocide, and water. The sinterable material is exposed to radiation, whereby the coalescent agent at least partially cures the portion of the sinterable material in contact with the coalescent agent, and the modifying agent i) reduces curing of the portion of the sinterable material in contact with both the coalescent agent and the modifying agent ii)

(Continued)

prevents curing of the other portion of the sinterable material in contact with the modifying agent, or iii) both i and ii.

18 Claims, 6 Drawing Sheets

(51) Int. Cl.
    *B29C 64/165*     (2017.01)
    *B33Y 30/00*     (2015.01)
    *B33Y 70/00*     (2015.01)
    *B29K 105/00*     (2006.01)

(52) U.S. Cl.
    CPC ............ *B29K 2105/0005* (2013.01); *B29K 2105/0011* (2013.01); *B29K 2105/251* (2013.01)

(58) Field of Classification Search
    USPC .......................................................... 264/497
    See application file for complete search history.

(56) References Cited

U.S. PATENT DOCUMENTS

| | | |
|---|---|---|
| 7,550,518 B2 | 6/2009 | Bredt et al. |
| 7,767,132 B2 | 8/2010 | Patel et al. |
| 8,642,336 B2 | 2/2014 | Vacanti et al. |
| 2003/0175411 A1 | 9/2003 | Kodas et al. |
| 2005/0059757 A1* | 3/2005 | Bredt .................. B33Y 10/00 524/3 |
| 2005/0079086 A1 | 4/2005 | Farr et al. |
| 2005/0247235 A1* | 11/2005 | Voeght .............. C09D 11/101 106/31.27 |
| 2006/0244169 A1 | 11/2006 | Monsheimer et al. |
| 2007/0043144 A1* | 2/2007 | House .............. C09D 11/322 523/160 |
| 2007/0183918 A1* | 8/2007 | Monsheimer ........ B28B 1/001 419/1 |
| 2007/0238056 A1 | 10/2007 | Baumann et al. |
| 2008/0020311 A1* | 1/2008 | Wu .................... G03G 5/047 430/69 |
| 2010/0068330 A1* | 3/2010 | Martinoni .......... C08L 77/00 425/542 |
| 2011/0249048 A1 | 10/2011 | Gullentops et al. |

FOREIGN PATENT DOCUMENTS

| | | |
|---|---|---|
| JP | 2001524897 | 12/2001 |
| WO | WO 01/38061 | 5/2001 |
| WO | WO 2004/009281 | 1/2004 |

* cited by examiner

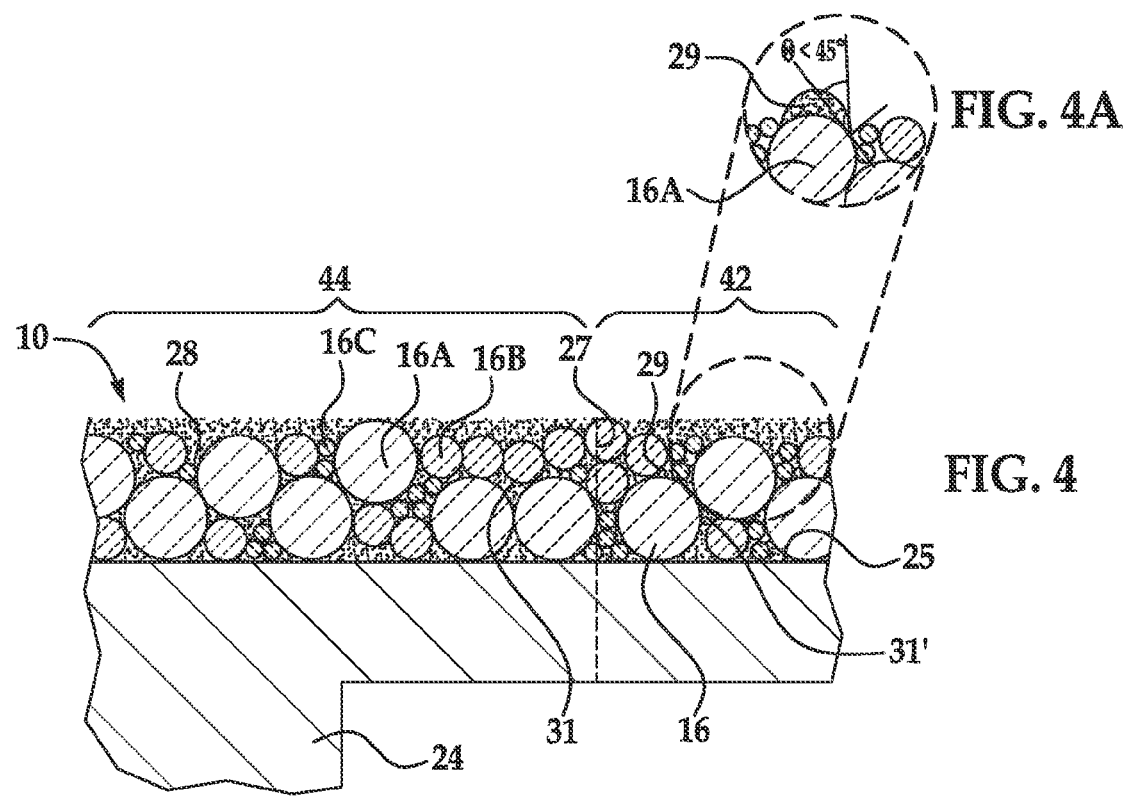
FIG. 4A
FIG. 4
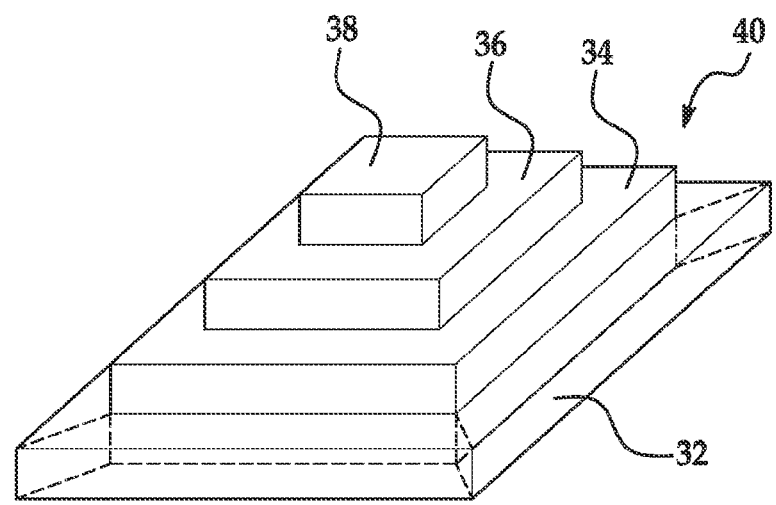
FIG. 5

THREE-DIMENSIONAL (3D) PRINTING METHOD

BACKGROUND

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4 is a side cross-sectional view taken along line 4-4 of FIG. 3;

FIG. 4A is an enlarged view of the identified portion of FIG. 4, schematically illustrating a contact angle between the modifying agent and the sinterable material within the edge boundary;

FIG. 5 is a perspective view of a 3D object formed by the method shown in FIGS. 2A through 2F;

DETAILED DESCRIPTION

Examples of the three-dimensional (3D) printing method disclosed herein utilize light area processing (LAP). During light area processing, an entire layer of a sinterable material is exposed to radiation, but only a selected region of the sinterable material is fused and hardened to become a layer of a 3D object. In the examples disclosed herein, a coalescent agent is selectively deposited in contact with the selected region of the sinterable material. The coalescent agent(s) is capable of penetrating into the layer of the sinterable material and spreading onto the exterior surface of the sinterable material. This coalescent agent is capable of absorbing radiation and converting the absorbed radiation to thermal energy, which in turn melts or sinters the sinterable material that is in contact with the coalescent agent. This causes the sinterable material to fuse, bind, cure, etc. to form the layer of the 3D object.

In some instances, it has been found that the thermal energy may propagate into surrounding sinterable material. This may result in the subsequent solidification of area(s)/portion(s) of the sinterable material that were not intended to be solidified, and this effect is referred to herein as coalescence bleed. Coalescence bleed may result, for example, in a reduction in the overall dimensional accuracy of generated three-dimensional objects. For example, edge acuity may be undesirably rough, undefined, etc. The effects of coalescence bleed may be managed by delivering an example of the modifying agent disclosed herein to appropriate portion(s) of the sinterable material prior to radiation exposure. Examples of the modifying agent serve to reduce the degree of coalescence, or prevent coalescence of a portion of the sinterable material on which the modifying agent has been delivered or has penetrated. As such, the modifying agent disclosed herein contributes to the generation of dimensionally accurate 3D objects in real-time without the need for post-object mechanical refining processes (e.g., tumbling, stone polishing, etc.).

Figure 1:
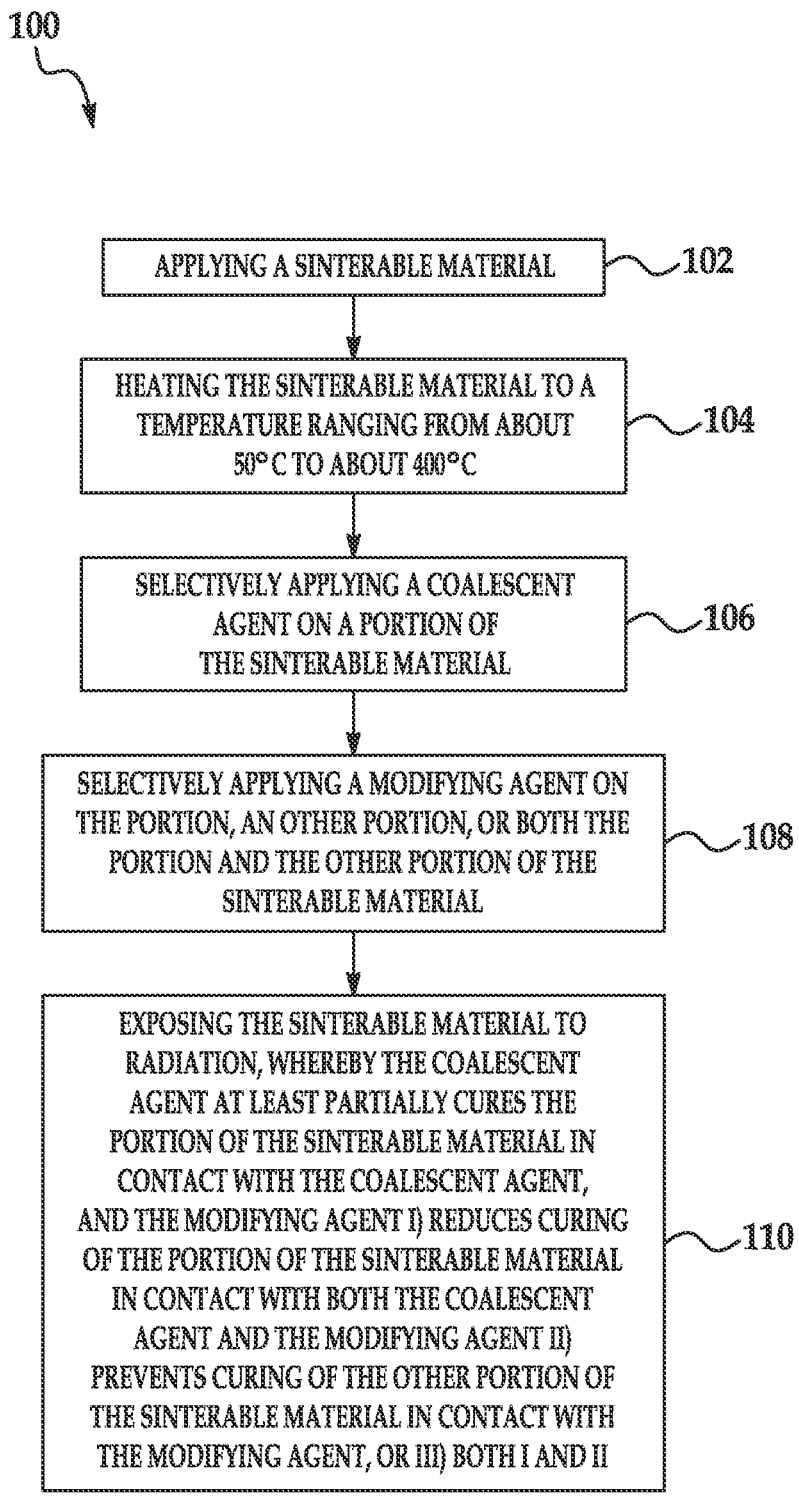
FIG. 1 is a flow diagram illustrating an example of a 3D printing method disclosed herein.

An example of the 3D printing method 100 is depicted in FIG. 1. It is to be understood that each of the steps of the method 100 shown in FIG. 1 will be discussed in detail herein, and in some instances, FIGS. 2A through 2F and FIGS. 3 and 3A will be discussed in conjunction with FIG. 1.

As shown at reference numeral 102, the method 100 includes depositing a sinterable material. An example of this step 102 is shown in cross-section at FIG. 2A. In the example shown in FIG. 2A, one layer 10 of the sinterable material 16 has been deposited, as will be discussed in more detail below.

The sinterable material 16 may be a powder, a liquid, a paste, or a gel. Examples of sinterable material 16 include semi-crystalline thermoplastic materials with a wide processing window of greater than 5° C. (i.e., the temperature range between the melting point and the re-crystallization temperature). Some specific examples of the sinterable material 16 include polyamides (e.g., PA or nylon 11, PA or nylon 12, PA or nylon 6, PA or nylon 8, PA or nylon 9, PA or nylon 66, PA or nylon 612, PA or nylon 812, PA or nylon 912, etc.). Other specific examples of the sinterable material 16 include polyethylene, polyethylene terephthalate (PET), and amorphous variation of these materials. Still other examples of suitable sinterable materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

The sinterable material 16 may have a melting point ranging from about 50° C. to about 400° C. In general, it is desirable that the melting point of the sinterable material 16 be less than (lower than) the melting point of an inorganic salt used in the modifying agent (discussed further below). As examples, polyamide 12 having a melting point of 180° may be used, or thermal polyurethanes having a melting point ranging from about 100° C. to about 165° C. may be used. When a combination of polymer particles is used in the sinterable material 16, at least one of the particles has a melting point below the melting point of the inorganic salt. In an example, each of the plurality of polymer particles used in the sinterable material 16 has a melting point below the melting point of the inorganic salt.

The sinterable material 16 may be made up of similarly sized particles or differently sized particles. In the examples shown herein, the sinterable material 16 includes particles of three different sizes. The particle size distribution is clearly shown in FIG. 4, where the average size of the first particle 16A is larger than the average size of the second particle 16B, and the average size of the second polymer particle 16B is larger than the average size of the third polymer particle 16C. The term "size", as used herein, refers to the diameter of a spherical particle, or the average diameter of a non-spherical particle (i.e., the average of multiple diameters across the particle). In general, the average size of the particles of the sinterable material 16 ranges from 5 μm to about 100 μm. As an example of the different sizes for each of the particles 16A, 16B, 16C, the average size of the first particle 16A may be greater than 50 μm, the average size of the second particle 16B may be between 10 μm and 30 μm, and the average size of the third particle 16C may be equal to or less than 10 μm. In an example, the first particle 16A is present in an amount ranging from about 70 wt % to about 95 wt %, the second particle 16B is present in an amount ranging from about 0.5 wt % to about 21 wt %, and the third particle 16C is present in an amount ranging from greater than 0 wt % up to about 21 wt %.

It is to be understood that sinterable material 16 may include, in addition to polymer particles 16A, 16B, and/or 16C, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymer particles.

Flow aid(s) may be added to improve the coating flowability of the sinterable material 16. Flow aid(s) may be particularly desirable when the particles 16A, 16B, and/or 16C are less than 25 μm in size. The flow aid improves the flowability of the sinterable material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the particles 16A, 16B, and/or 16C.

Figure 2A:
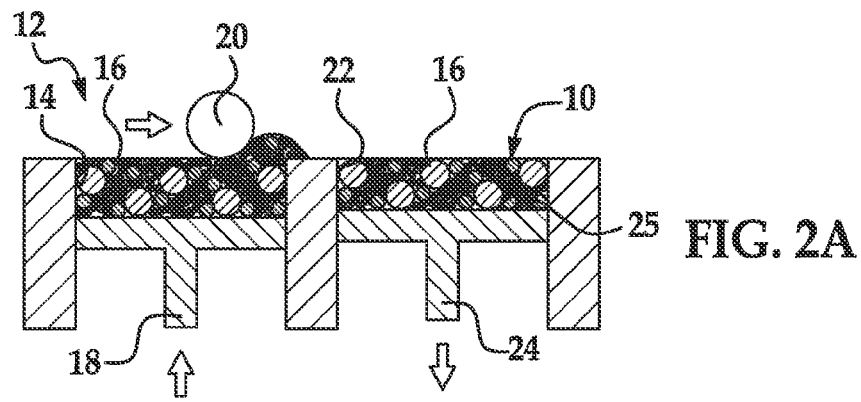
FIGS. 2A through 2F are cross-sectional views of the steps involved in forming layer(s) of a 3D object using an example of the 3D printing method disclosed herein.

In the example shown in FIG. 2A, a printing system 12 for forming the 3D object includes a supply bed 14 (including a supply of the sinterable material 16), a delivery piston 18, a roller 20, a fabrication bed 22 (having a contact surface 25), and a fabrication piston 24. Each of these physical elements may be operatively connected to a central processing unit (not shown) of the printing system 12. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the sinterable material 16, the coalescent agent, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the sinterable material 16 out of the opening in the supply bed 14 and the fabrication piston 24 may be programmed to move in the opposite direction of the delivery piston 18 in order to increase the depth of the fabrication bed 22. The delivery piston 18 will advance enough so that when the roller 20 pushes the sinterable material 16 into the fabrication bed 22 and onto the contact surface 25, the depth of the fabrication bed 22 is sufficient so that a layer 10 of the sinterable material 16 may be formed in the bed 22. The roller 20 is capable of spreading the sinterable material 16 into the fabrication bed 22 to form the layer 10, which is relatively uniform in thickness. In an example, the thickness of the layer 10 ranges from about 90 μm to about 110 μm, although thinner or thicker layers may also be used.

It is to be understood that the roller 20 may be replaced by other tools, such as a blade that may be desirable for spreading different types of powders, or a combination of a roller and a blade.

Figure 2B:
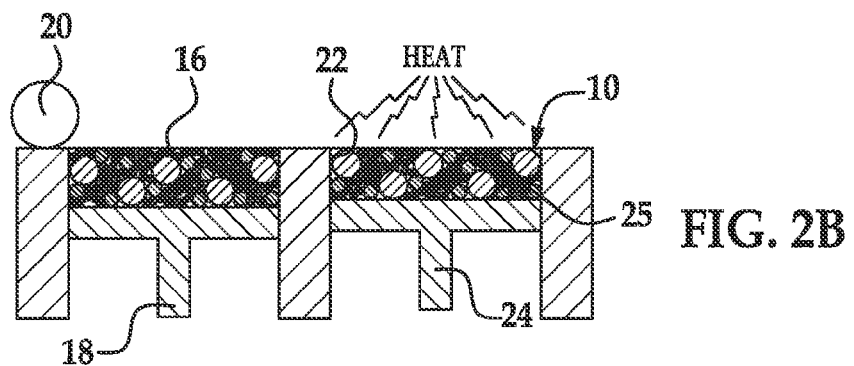

After the layer 10 of the sinterable material 16 is deposited in the fabrication bed 22, the layer 10 is exposed to heating (as shown at reference number 104 in FIG. 1 and in FIG. 2B). Heating is performed to pre-heat the sinterable material 16, and thus it is desirable that the heating temperature be below the melting point of the sinterable material 16. As such, the temperature selected will depend upon the sinterable material 16 that is used. As examples, the heating temperature may be from about 5° C. to about 50° C. below the melting point of the sinterable material. In an example, the heating temperature ranges from about 50° C. to about 400° C. In another example, the heating temperature ranges from about 150° C. to about 170° C.

Pre-heating the layer 10 of the sinterable material 16 may be accomplished using any suitable heat source that exposes all of the sinterable material 16 in the fabrication bed 22 to the heat. Examples of the heat source include a thermal heat source or a light radiation source.

Figure 2C:
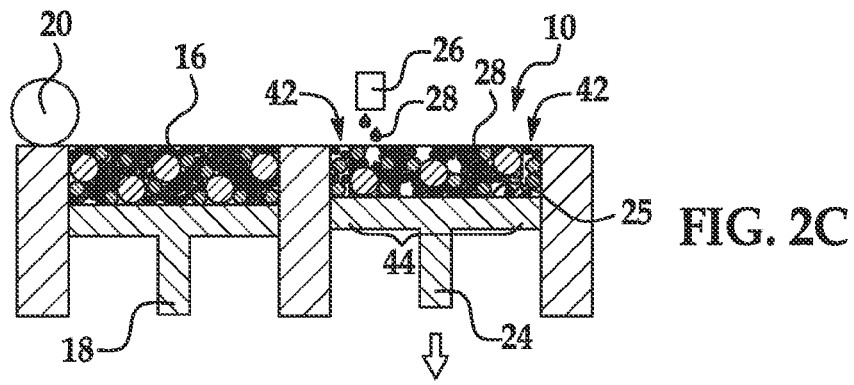

After pre-heating the layer 10, the coalescent agent is selectively applied on a portion of the sinterable material 16 in the layer 10, as shown at reference number 106 in FIG. 1 and in FIG. 2C. As illustrated in FIG. 2C, the coalescent agent 28 may be dispensed from an inkjet printhead 26. While a single printhead is shown in FIG. 2C, it is to be understood that multiple printheads may be used that span the width of the fabrication bed 22. The printhead 26 may be attached to a moving XY stage or a translational carriage (neither of which is shown) that moves the printhead 26 adjacent to the fabrication bed 22 in order to deposit the coalescent agent 28 in desirable area(s).

The printhead 26 may be programmed to receive commands from the central processing unit and to deposit the coalescent agent 28 according to a pattern of a cross-section for the layer of the 3D object that is to be formed. As used herein, the cross-section of the layer of the object to be formed refers to the cross-section that is parallel to the contact surface 25. The printhead 26 selectively applies the coalescent agent 28 on those portion(s) of the layer 10 that are to be fused to become the first layer of the 3D object. As an example, if the first layer is to be shaped like a cube or cylinder, the coalescent agent 28 will be deposited in a square pattern or a circular pattern (from a top view), respectively, on at least a portion of the layer 10 of the sinterable material 16. In the example shown in FIG. 2C, the coalescent agent 28 is deposited in a square pattern on the portion 44 of the layer 10 and not on the portions 42.

Examples of suitable coalescent agents 28 are water-based dispersions including a radiation absorbing binding agent (i.e., an active material). The active agent may be an infrared light absorber, a near infrared light absorber, or a visible light absorber. As one example, the coalescent agent 28 may be an ink-type formulation including carbon black as the active material. An example of this ink-type formulation is commercially known as CM997A available from Hewlett-Packard Company. Examples of inks including visible light enhancers as the active agent are dye based colored ink and pigment based colored ink. Examples of pigment based inks include the commercially available inks CM993A and CE042A, available from Hewlett-Packard Company.

The aqueous nature of the coalescent agent 28 enables the coalescent agent 28 to penetrate, at least partially, into the layer 10 of the sinterable material 16. The sinterable material 16 may be hydrophobic, and the presence of a co-solvent and/or a surfactant in the coalescent agent 28 may assist in obtaining desirable wetting behavior.

It is to be understood that a single coalescent agent 28 may be selectively applied to form the layer of the 3D object, or multiple coalescent agents 28 may be selectively applied to form the layer of the 3D object.

Figure 2D:
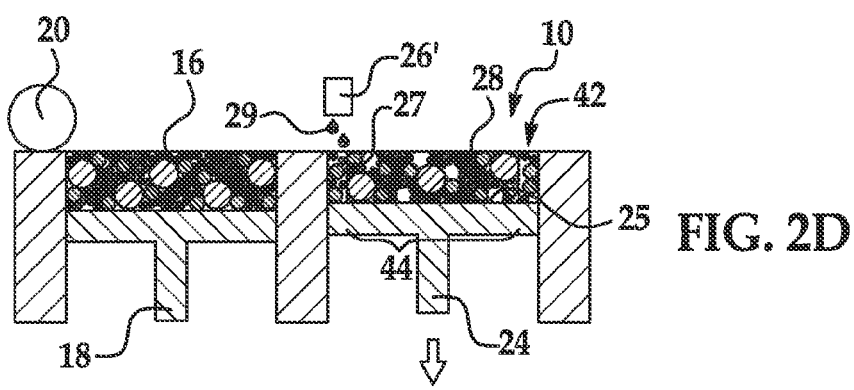
Figure 2E:
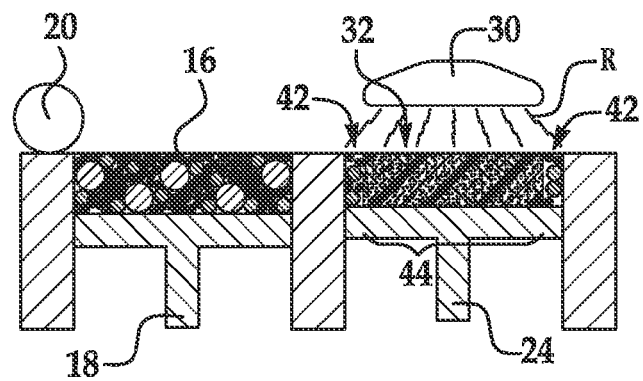

After the coalescent agent 28 is/are selectively applied on the desired portion(s) 44, the modifying agent is selectively applied on the same and/or on different portion(s) of the sinterable material, as shown at reference numeral 108 in FIG. 1. An example of the selective application of the modifying agent is schematically shown in FIG. 2D, where reference numeral 29 represents the modifying agent and reference numeral 42 represents the portions of the sinterable material 16 to which the modifying agent 29 is selectively applied.

The modifying agent 29 includes an inorganic salt, a surfactant, a co-solvent, a humectant, a biocide, and water. In some examples, the modifying agent 29 consists of these components, and no other components. It has been found that this particular combination of components effectively reduces or prevents coalescence bleed, in part because of the presence of the inorganic salt.

The inorganic salt that is used in the modifying agent 29 has a relatively high heat capacity, but a relatively low heat emissivity. These characteristics render the modifying agent 29 as being capable of absorbing the radiation (and its associated thermal energy) applied thereto, and also being capable of retaining a bulk of the thermal energy therein. As such, very little, if any, of the thermal energy is transferred from the modifying agent 29 to the sinterable material 16 in contact therewith.

In addition, the inorganic salt may also have a lower thermal conductivity and/or a higher melting point than the thermal conductivity and/or melting point of the sinterable material 16 (e.g., particles 16A, 16B, and/or 16C) and, in some instances, of the active material in the coalescent material 28. Upon absorbing radiation and thermal energy, the inorganic salt does not melt, and also does not transfer a sufficient amount of heat to the surrounding sinterable material 16. Therefore, the modifying agent 29 disclosed herein can effectively reduce curing of the sinterable material 16 when the sintering material 16 is in contact with both the coalescent agent 28 and the modifying agent 29, and prevent curing of the sinterable material 16 when the sintering material 16 is in contact with the modifying agent 29 alone.

The inorganic salt is water soluble. Examples of suitable water soluble inorganic salts include sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof. The inorganic salt may be present in an amount ranging from about 5.0 wt % to about 50 wt % with respect to a total weight of the modifying agent 29.

The modifying agent 29 also includes the surfactant. The type and amount of surfactant may be selected so that a contact angle $\ominus$ with a contact line of the sinterable material 16 is less than 45°. An example of the modifying agent 29 applied on the sinterable material 16 and the resulting contact angle $\ominus$ is shown in FIG. 4A. The contact angle $\ominus$ of less than 45° ensures that the modifying agent 29 will sufficiently wet the sinterable material 16 as shown in FIG. 4A.

The components of the modifying agent 29 may be mixed together, and then the amount of surfactant may be adjusted to achieve the desirable contact angle. It has been found that a suitable amount of surfactant to achieve the desired contact angle $\ominus$ may range from about 0.1 wt % to about 10 wt % with respect to the total weight of the modifying agent 29. Examples of suitable surfactants include tetraethylene glycol, liponic ethylene glycol 1 (LEG-1), a self-emulsifiable, nonionic wetting agent based on acetylenic diol chemistry (e.g., SURFYNOL® SEF from Air Products and Chemicals, Inc.), a nonionic fluorosurfactants (e.g., CAPSTONE® fluorosurfactants from DuPont, previously known as ZONYL FSO), and combinations thereof.

As noted above, the modifying agent 29 also includes the co-solvent, the humectant, and the biocide. The co-solvent is present in an amount ranging from about 1.0 wt % to about 20 wt %, the humectant is present in an amount ranging from about 0.1 wt % to about 15 wt %, and the biocide is present in an amount ranging from about 0.01 wt % to about 5 wt %, each of which is with respect to the total weight of the modifying agent 29. Suitable co-solvents include 2-hydroxyethyl-2-pyrollidinone, 2-pyrollidinone, 1,6-hexanediol, and combinations thereof. Examples of suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, *quillaia*, glycerin, 2-methyl-1,3-propanediol, and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

The balance of the modifying agent 29 is water. As such, the amount of water may vary depending upon the amounts of inorganic salt, surfactant, co-solvent, humectant, and biocide that are included.

The modifying agent 29 may be selectively applied in a manner similar to the coalescent agent 28. In an example, the modifying agent may be applied at the same time that the coalescent agent 28 is dispensed, using a single pass or using multiple passes. In another example, the modifying agent 29 may be applied after the coalescent agent 28 is dispensed.

As depicted in FIG. 2D, the modifying agent 29 may be dispensed from an inkjet printhead 26'. While a single printhead is shown in FIG. 2D, it is to be understood that multiple printheads may be used that span the width of the fabrication bed 22. The printhead 26' may be attached to a moving XY stage or a translational carriage (neither of which is shown) that moves the printhead 26' adjacent to the fabrication bed 22 in order to deposit the modifying agent in desirable area(s). The printhead 26' may be programmed to receive commands from the central processing unit and to deposit the modifying agent 29 in the desired portion(s) 44 and/or 42.

In an example, it may be desirable to enhance, refine, smooth, etc. the edge(s) of the layer of the 3D object that is being formed. In this example, the coalescent agent 28 may be selectively applied according to the pattern of the cross-section (which is parallel to the contact surface 25) for the layer of the 3D object, and the modifying agent 29 may be selectively applied along at least part of an edge boundary 27 of that cross-section. An example of this is shown in FIG. 2D (side cross-sectional view of the system 12) and in FIG. 3 (top view of the sinterable material 16 in the fabrication bed 22). In the example shown in these figures, the shape of the 3D object layer to be formed is a rectangular prism, and the pattern of the cross-section that is parallel to the contact surface 25 is a square or rectangle having edge boundary 27. The sinterable material 16 within the edge boundary 27 is the portion 44 upon which the coalescent agent 28 is selectively applied. The sinterable material 16 positioned between the edge boundary 27 and the edges of the fabrication bed 22 is outside the pattern of the cross-section, and thus is the portion 42 upon which the modifying agent 29 is selectively applied.

Referring briefly to FIG. 4, a cross-section (along line 4-4 of FIG. 3) of the two portions 42 and 44 is depicted. It is to be understood that this cross-section is perpendicular to the contact surface 25 and is not the same as the cross-section of the pattern of the layer. The view in FIG. 4 illustrates some of the sinterable material 16 on the contact surface 25 after the coalescent agent 28 and modifying agent 29 are applied thereon. As depicted, the coalescent agent 28 penetrates into at least some of the voids 31 between the particles 16A, 16B, 16C of the sinterable material 16 within the portion 44. Similarly, the modifying agent 29 penetrates into at least some of the voids 31' between the particles 16A, 16B, 16C of the sinterable material 16 within the portion 42 outside of the edge boundary 27. In the example shown in FIGS. 2D, 3, and 4, the modifying agent 29 is capable of preventing curing (fusing, sintering, etc.) of the portion 42 of the sinterable material 16, while the coalescent agent 28 is capable of enhancing curing (fusing, sintering, etc.) of the portion 44 of the sinterable material 16.

In another example, it may be desirable to obtain different levels of curing/fusing/sintering within the layer of the 3D object that is being formed. Different levels of curing/fusing/sintering may be desirable to control internal stress distribution, warpage, mechanical strength performance, and/or elongation performance of the 3D object. In this example, the coalescent agent 28 may be selectively applied according to the pattern of the cross-section (which is parallel to the contact surface 25) for the layer of the 3D object, and the modifying agent 29 may be selectively applied within at least a portion of that cross-section. As such, the modifying agent 29 is applied to all or some of the portion 44 of the sinterable material 16 upon which the coalescent agent 28 is applied. As an example, the modifying agent 29 may be applied at or near the center of the portion 44 of the sinterable material 16 and may not be applied near the edge boundary 27 of the portion 44 of the sinterable material 16. This type of application may be desirable when the edges of the layer to be formed are to be mechanically stronger than the interior of the layer. In this example, the modifying agent 29 is capable of reducing the level of curing (fusing, sintering, etc.) at the center of the portion 44 of the sinterable material 16. Since the coalescent agent 28 is present in the portion 44 with the modifying agent 29, curing is not completely prevented. It is to be understood that when the modifying agent 29 is applied within the same portion 44 as the coalescent agent 28, the modifying agent 29 may be applied in any desirable pattern.

In still another example, it may be desirable to enhance, refine, smooth, etc. the edge(s) of the layer of the 3D object that is being formed and to obtain different levels of curing/fusing/sintering within the layer of the 3D object that is being formed. In this example, the coalescent agent 28 may be selectively applied according to the pattern of the cross-section (which is parallel to the contact surface 25) for the layer of the 3D object, and the modifying agent 29 may be selectively applied along/outside of at least part of an edge boundary 27 of that cross-section (i.e., in portion 42) and may be selectively applied within at least a portion of that cross-section (i.e., in portion 44).

As the layers of the 3D object are built up in the Z-direction, uniformity or variations in curing/fusing/sintering may be achieved along the XY plane and/or along the Z axis. Substantially uniform curing/fusing/sintering may be achieved by applying the coalescent agent 28 within the cross-section of the pattern for each layer and applying the modifying agent 29 outside of the edge boundary 27 of each layer at the same voxel density. In one example, variations in curing/fusing/sintering within the cross-section of the layers may be achieved by applying the coalescent agent 28 at the same voxel density in each layer, and also applying the modifying agent 29 throughout the cross-sections of each of the respective layers at different voxel densities. As an example, if it is desirable that level of curing/fusing/sintering decrease from layer to layer along the Z axis, the voxel density of the modifying agent 29 deposited within the respective cross-sections may be the lowest in the first layer and may be increased in subsequently formed layers.

It is desirable that the modifying agent 29 penetrate into the voids 31 and/or 31' between the particles 16A, 16B, 16C of the sinterable material 16. As discussed above, the penetration and wetting of the modifying agent 29 may be controlled by adjusting the contact angle $\Theta$ (see FIG. 4A). The contact angle $\Theta$ may be adjusted by controlling the amount of surfactant in the modifying agent 29. It is to be understood, however, that the amount of modifying agent 29 applied to the sinterable material 16 may also affect the penetration. As such, the volumetric ratio of total particles 16A, 16B, 16C within a target region (e.g., the portion 42 and/or 44) to the total volume of applied modifying agent 29 within that target region may be considered when applying the modifying agent 29. The volumetric ratio of the total volume of sinterable material 16 to the total volume of applied modifying agent 29 may range from about 2:1 to about 200:1. In an example, the desired ratio can be achieved by using suitable amounts (previously discussed) of the inorganic salt in the modifying agent 29 along with a suitable drop volume during application (e.g., from about 1 pL to about 50 pL). In an example in which small drop sizes (<10 pL) are utilized to control lateral spreading, the application of the desired amount can be achieved by increasing the jetting frequency and or implementing multiple passes of the pen carriage.

After the coalescent agent 28 and the modifying agent 29 are selectively applied in the desired portions 44 and/or 42, the entire layer 10 of the sinterable material 16 is exposed to radiation R. This is shown at reference numeral 110 of FIG. 1 and in FIG. 2E.

The radiation R is emitted from a radiation source 30, such as an IR, near-IR, UV, or visible curing lamp, IR, near-IR, UV, or visible light emitting diodes (LED), or lasers with specific wavelengths. The radiation source 30 used will depend, at least in part, on the type of coalescent agent 28 that is used. The radiation source 30 may be attached, for example, to a carriage that also holds the printhead(s) 26, 26'. The carriage may move the radiation source 30 into a position that is adjacent to the fabrication bed 22. The radiation source 30 may be programmed to receive commands from the central processing unit and to expose the layer 10, including the coalescent agent 28 and modifying agent 29, to radiation R. The length of time the radiation R is applied for, or energy exposure time, may be dependent, for example, on one or more of: characteristics of the radiation source 30; characteristics of the sinterable material 16; and/or characteristics of the coalescent agent 28.

The coalescent agent 28 enhances the absorption of the radiation R, converts the absorbed radiation to thermal energy, and promotes the transfer of the thermal heat to the sinterable material 16 in contact therewith (i.e., in the portion 44). In an example, the coalescent agent 28 sufficiently elevates the temperature of the sinterable material 16 in the portion 44 above the melting point(s), allowing curing (e.g., sintering, binding, fusing, etc.) of the particles 16A, 16B, 16C to take place.

When the modifying agent 29 is applied with the coalescent agent 28 in at least part of the portion(s) 44, different curing levels may be achieved. In this example, the presence of the modifying agent 29 may cause the coalescent agent 28 to heat the sinterable material 16 a temperature that is below its melting point but is suitable to cause softening and bonding of the particles 16A, 16B, 16C.

Still further, it is to be understood that portions 42 of the sinterable material that do not have the coalescent agent 28 applied thereto but do have the modifying agent 29 applied thereto do absorb energy. However, the modifying agent 29 does not emit the absorbed energy to the adjacent sinterable material 16. As such, in these instances, the particles 16A, 16B, 16C within the portion(s) 42 generally do not exceed the melting point(s) of the particles 16A, 16B, 16C and do not cure.

Exposure to radiation R forms one layer 32 of the 3D object 40 (see FIG. 2F) to be formed.

Steps 102 through 110 of FIG. 1 (shown and described in reference to FIGS. 2A through 2F) may be repeated as many times as desirable to create subsequent layers 34, 36, 38 (FIG. 2F) and to ultimately form the 3D object 40. It is to be understood that heat absorbed during the application of energy from a portion of the sinterable material 16 on which coalescent agent 28 has been delivered or has penetrated may propagate to a previously solidified layer, such as layer 32, causing at least some of that layer to heat up above its melting point. This effect helps create strong interlayer bonding between adjacent layers of the 3D object 40.

Figure 2F:
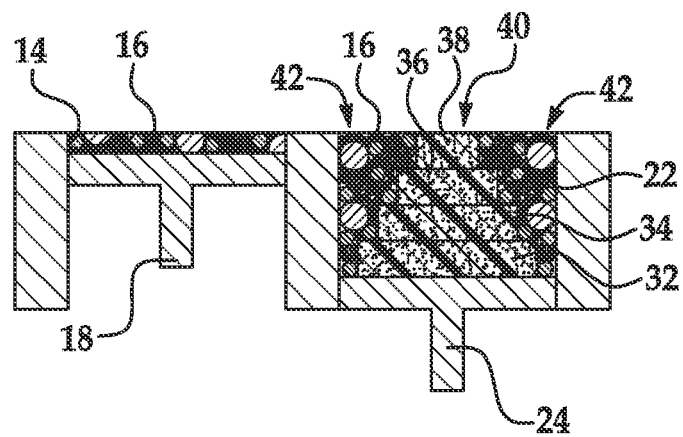
Figure 3:
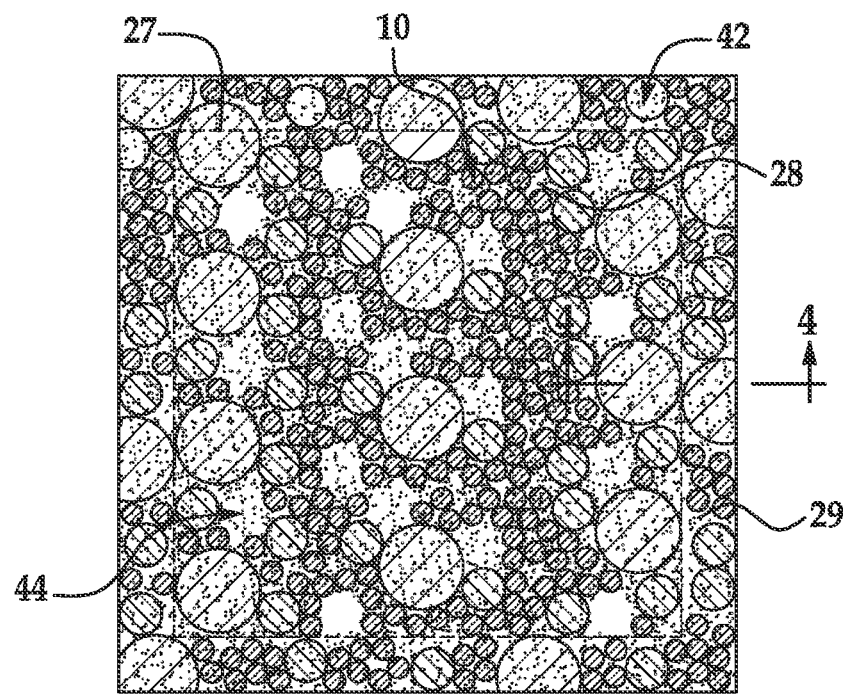
FIG. 3 is a top, schematic view of the sinterable material of FIG. 2D, with a coalescent agent applied on a portion thereof within a cross-section of the 3D object to be formed and with a modifying agent applied on another portion thereof at an edge boundary.

FIG. 2F illustrates one example of the 3D object 40. It is to be understood, however, that the subsequently formed layers 34, 36, 38 may have any desirable shape and/or thickness and may be the same as or different from any other layer 32, 34, 36, 38 depending upon the size, shape, etc. of the 3D object 40 that is to be formed.

As illustrated in FIG. 2F, as subsequent layers 34, 36, 38 have been formed, the delivery piston 18 is pushed closer to the opening of the delivery bed 14, and the supply of the sinterable material 16 in the delivery bed 14 is diminished (compared, for example, to FIG. 2A at the outset of the method). The fabrication piston 24 is pushed further away from the opening of the fabrication bed 22 in order to accommodate the subsequent layer(s) of sinterable material 16, the selectively applied coalescent agent 28, and the selectively applied modifying agent 29. Since at least some of the sinterable material 16 remains uncured after each layer 32, 34, 36, 38 is formed, the 3D object 40 is at least partially surrounded by the uncured sinterable material 16 and modifying agent 29 in the fabrication bed 22.

When the 3D object 40 is complete, it may be removed from the fabrication bed 22, and the uncured sinterable material 16 and modifying agent 29 may be separated from one another. In an example, a water treatment (e.g., dissolution of the modifying agent, filtration, etc.) may be used to remove the modifying agent 29 from the sinterable material 16. The uncured sinterable material 16 may be washed and then reused.

FIG. 5 illustrates a perspective view of the example of the 3D object 40 formed by the method shown in FIGS. 2A through 2E. Each of the layers 32, 34, 36, 38 includes cured (sintered, fused, etc.) sinterable material and the active material in the coalescent agent 28 binding the cured sinterable material.

Figure 6:
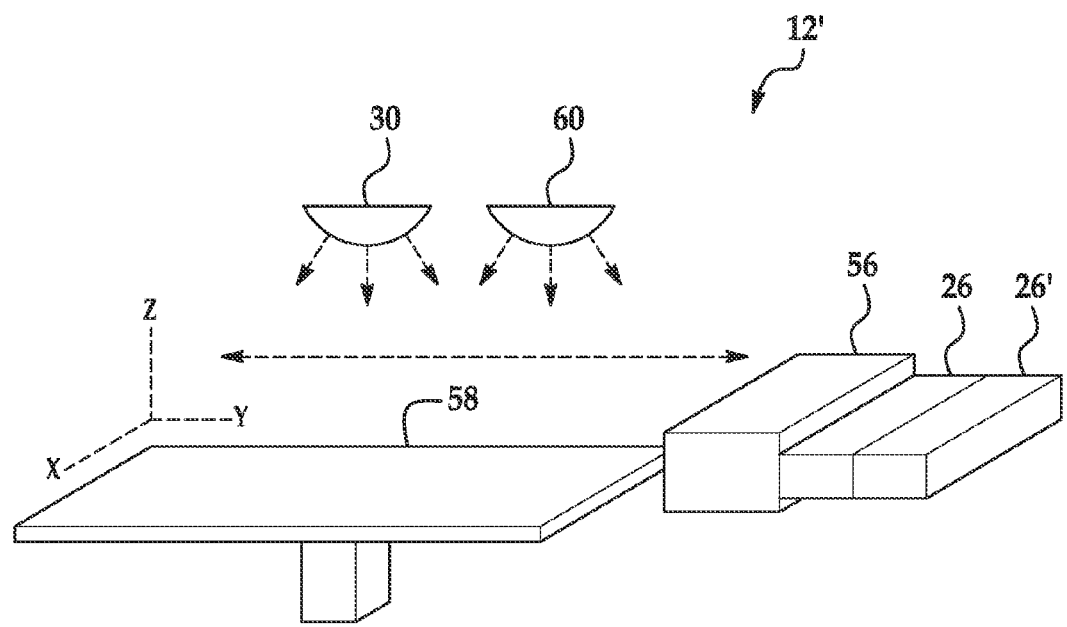
FIG. 6 is a simplified isometric view of an example of a 3D printing system that may be used in an example of the 3D printing method as disclosed herein.
Figure 6:
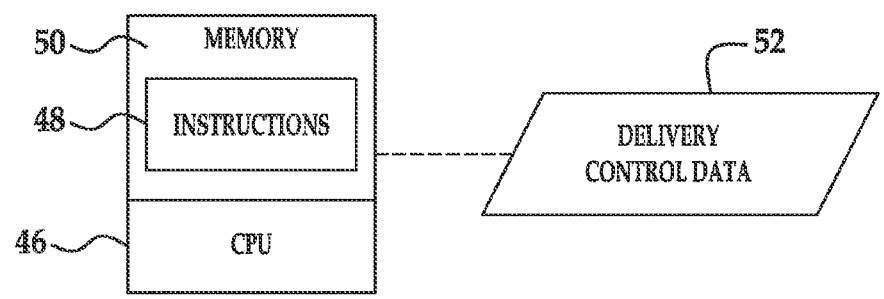

Referring now to FIG. 6, another example of the printing system 12' is depicted. The system 12' includes a central processing unit 46 that controls the general operation of the additive printing system 12'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 12' in accordance with the instructions 48.

In this example, the printing system 12' includes a coalescent agent distributor 26 to selectively deliver coalescent agent 28 to portion(s) 44 of the layer (not shown in this figure) of sinterable material 16 provided on a support member 58. In this example, the printing system 12' also includes a modifying agent distributor 26' to selectively deliver modifying agent 29 to other portion(s) 42 and/or the portion(s) 44 of the layer (not shown in this figure) of sinterable material 16 provided on a support member 58.

In an example, the support member 58 has dimensions ranging from about 10 cm by 10 cm up to about 100 cm by 100 cm, although the support member 58 may have larger or smaller dimensions depending upon the 3D object 40 that is to be formed.

The central processing unit 46 controls the selective delivery of the coalescent agent 28 and the modifying agent 29 to the layer of the sinterable material 16 in accordance with delivery control data 52.

In the example shown in FIG. 6, it is to be understood that the distributors 26, 26' are printheads, such as thermal printheads or piezoelectric inkjet printheads. The printheads 26, 26' may be drop-on-demand printheads or continuous drop printheads.

The printheads 26, 26' may be used to selectively deliver the coalescent agent 28 and modifying agent 29, respectively, when in the form of a suitable fluid. As described above, each of the coalescent agent 28 and the modifying agent 29 includes an aqueous vehicle, such as water, co-solvent(s), surfactant(s), etc., to enable it to be delivered via the printheads 26, 26'.

In one example the printhead 26, 26' may be selected to deliver drops of the coalescent agent 28 and the modifying agent 29 at a resolution ranging from about 300 dots per inch (DPI) to about 1200 DPI. In other examples, the printhead 26, 26' may be selected to be able to deliver drops of the coalescent agent 28 and the modifying agent 29 at a higher or lower resolution. The drop velocity may range from about 5 m/s to about 24 m/s and the firing frequency may range from about 1 kHz to about 100 kHz.

Each printhead 26, 26' may include an array of nozzles through which the printhead 26, 26' is able to selectively eject drops of fluid. In one example, each drop may be in the order of about 10 pico liters (pl) per drop, although it is contemplated that a higher or lower drop size may be used. In some examples, printheads 26, 26' are able to deliver variable size drops.

The printheads 26, 26' may be an integral part of the printing system 12', or it may be user replaceable. When the printheads 26, 26' are user replaceable, they may be removably insertable into a suitable distributor receiver or interface module (not shown).

In another example of the printing system 12', a single inkjet printhead may be used to selectively deliver both the coalescent agent 28 and the modifying agent 29. For example, a first set of printhead nozzles of the printhead may be configured to deliver the coalescent agent 28, and a second set of printhead nozzles of the printhead may be configured to deliver the modifying agent 29.

As shown in FIG. 6, each of the distributors 26, 26' has a length that enables it to span the whole width of the support member 58 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 58. In other examples of the printing system 12', the distributors 26, 26' may have a shorter length that does not enable them to span the whole width of the support member 58.

While not shown in FIG. 6, it is to be understood that the distributors 26, 26' may be mounted on a moveable carriage to enable them to move bi-directionally across the length of the support member 58 along the illustrated y-axis. This enables selective delivery of the coalescent agent 28 and modifying agent 29 across the whole width and length of the support member 58 in a single pass. In other examples, the distributors 26, 26' may be fixed while the support member 58 is configured to move relative thereto.

As used herein, the term 'width' generally denotes the shortest dimension in the plane parallel to the X and Y axes shown in FIG. 6, and the term 'length' denotes the longest dimension in this plane. However, it is to be understood that in other examples the term 'width' may be interchangeable with the term 'length'. As an example, the distributors 26, 26' may have a length that enables it to span the whole length of the support member 58 while the moveable carriage may move bi-directionally across the width of the support member 58.

In examples in which the distributors 26, 26' have a shorter length that does not enable them to span the whole width of the support member 58, the distributors 26, 26' may also be movable bi-directionally across the width of the support member 58 in the illustrated X axis. This configuration enables selective delivery of the coalescent agent 28 and modifying agent 29 across the whole width and length of the support member 58 using multiple passes.

The distributors 26, 26' may respectively include therein a supply of the coalescent agent 28 and modifying agent 29, or may be respectively operatively connected to a separate supply of the coalescent agent 28 and modifying agent 29.

As shown in FIG. 6, the printing system 12' also includes a sinterable material distributor 56. This distributor 56 is used to provide the layer (e.g., layer 10) of the sinterable material 16 on the support member 58. Suitable sinterable material distributors 56 may include, for example, a wiper blade, a roller, or combinations thereof.

The sinterable material 16 may be supplied to the sinterable material distributor 56 from a hopper or other suitable delivery system. In the example shown, the sinterable material distributor 56 moves across the length (Y axis) of the support member 58 to deposit a layer of the sinterable material 16. As previously described, a first layer of sinterable material 16 will be deposited on the support member 58, whereas subsequent layers of the sinterable material 16 will be deposited on a previously deposited (and solidified) layer.

It is to be further understood that the support member 58 may also be moveable along the Z axis. In an example, the support member 58 is moved in the Z direction such that as new layers of sinterable material 16 are deposited, a predetermined gap is maintained between the surface of the most recently formed layer and the lower surface of the distributors 26, 26'. In other examples, however, the support member 58 may be fixed along the Z axis and the distributor 26 may be movable along the Z axis.

Similar to the system 12, the system 12' also includes the radiation source 30 to apply energy to the deposited layer of sinterable material 16, the coalescent agent 28, and the modifying agent 28 to cause the solidification of portion(s) 44 of the sinterable material 16. Any of the previously described radiation sources 30 may be used. In an example, the radiation source 30 is a single energy source that is able to uniformly apply energy to the deposited materials, and in another example, radiation source 30 includes an array of energy sources to uniformly apply energy to the deposited materials.

In the examples disclosed herein, the radiation source 30 is configured to apply energy in a substantially uniform manner to the whole surface of the deposited sinterable material 16. This type of radiation source 30 may be referred to as an unfocused energy source. Exposing the entire layer to energy simultaneously may help increase the speed at which a three-dimensional object may be generated.

While not shown, it is to be understood that the radiation source 30 may be mounted on the moveable carriage or may be in a fixed position.

The central processing unit 46 may control the radiation source 30. The amount of energy applied may be in accordance with delivery control data 52.

The system 12' may also include a pre-heater 60 that is used to pre-heat the deposited sinterable material 16 (as shown and described in reference to FIG. 2B). The use of the pre-heater 60 may help reduce the amount of energy that has to be applied by the radiation source 30.

To further illustrate the present disclosure, an example is given herein. It is to be understood that this example is provided for illustrative purposes and is not to be construed as limiting the scope of the present disclosure.

Example

A layer of polyimide-12 (PA-12) sinterable material was applied to a fabrication bed. A carbon black ink was used as the coalescent agent. An example of the modifying agent disclosed herein was used, and included 20% potassium iodide (as the inorganic salt), 8% 2-hydroxyethyl-2-pyrollidinone, 3% 1,6-Hexanediol, 7% 2-pyrollidinone, 3% tetraethylene glycol, 2% LEG-1, 0.75% SURFYNOL® 440, 0.1% ZONYL® FSO, 0.1% PROXEL® GXL, and a balance of water. The coalescent agent was thermal inkjet printed with a 9 ng printhead in a pattern on a portion of the PA-12 layer, and the modifying agent thermal inkjet printed with a 9 ng printhead on another portion of the PA-12 layer outside the edges of the pattern.

Some comparative examples were prepared by selectively depositing the coalescent agent without the modifying agent. Other comparative examples were as-received parts. Table 1 is a chart showing the examples and comparative examples, and the technique used in preparation of the respective examples/comparative examples.

TABLE 1

| | Processing Technique | Post Processing |
|---|---|---|
| Example 1 | LAP w/modifying agent at edge | None |
| Example 2 | LAP w/modifying agent at edge | Yes |
| Comparative Example 3 | LAP w/o modifying agent | None |
| Comparative Example 4 | LAP* w/o modifying agent | None |
| Comparative Example 5 | As-received part from Desktop Manufacturing - originally formed by selective laser sintering (SLS) | Yes, sand blasting |
| Comparative Example 6 | As-received part from EOS; originally formed by selective laser sintering (SLS) | Yes, sand blasting |
| Comparative Example 7 | As-received part from Desktop Manufacturing - originally formed by selective laser sintering (SLS) | Yes, Stone Polishing |
| Comparative Example 8 | As-received computer numerically controlled (CNC) machined acrylonitrile butadiene styrene (ABS) part | None |
| Comparative Example 9 | As-received CNC machined polycarbonate part | None |

*process profile optimized for materials used

Figure 7:
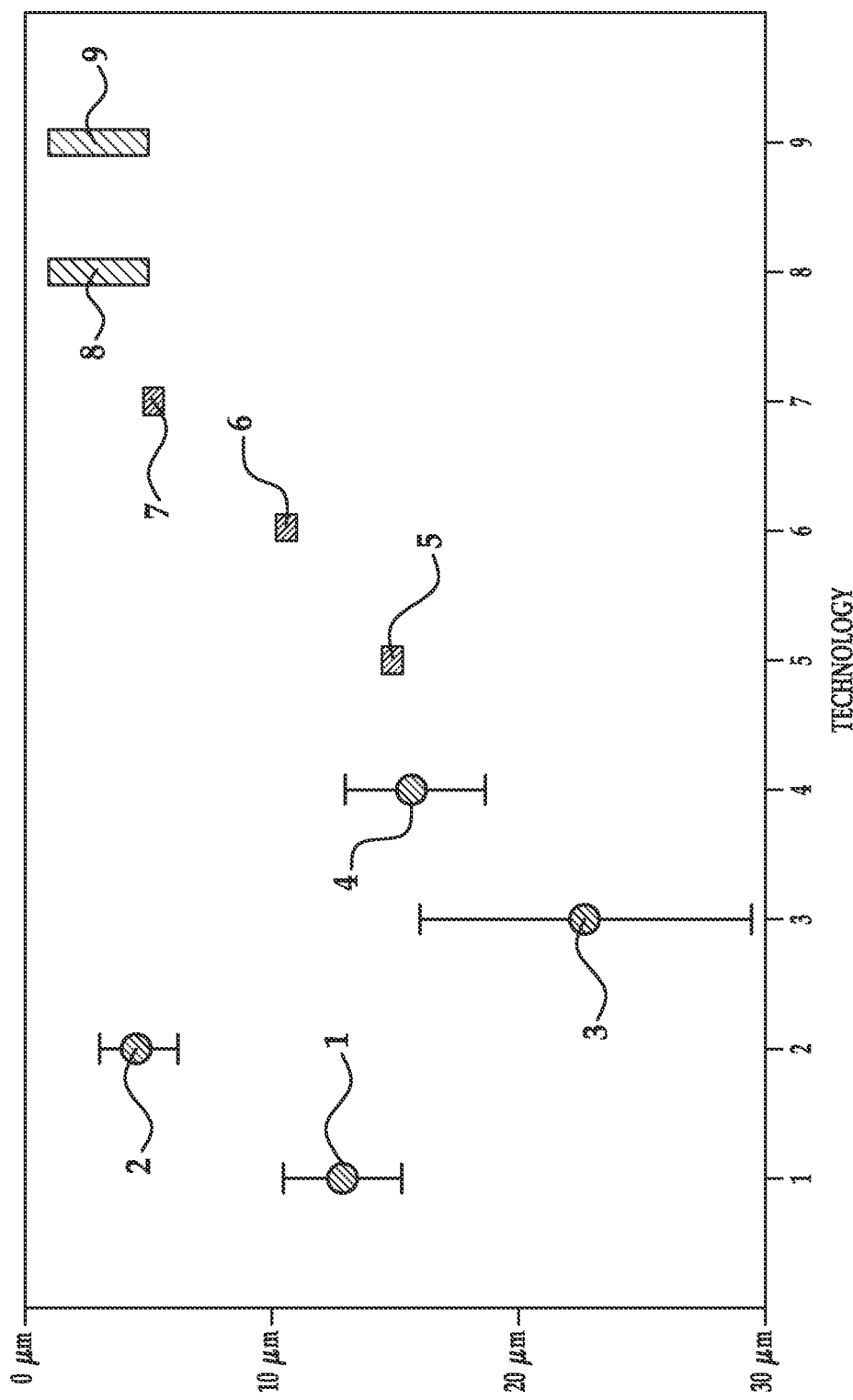
FIG. 7 is a graph illustrating the edge roughness of the part versus technology used to form the part.

The edge roughness of all of the examples and comparative examples was measured and compared. These results are shown in FIG. 7. The results in FIG. 7 illustrate that the modifying agent disclosed herein generally improves or exhibits comparable edge roughness, whether or not post-processing is utilized (e.g., compare example 1 with comparative examples 3, 4, and 5, and example 2 with comparative examples 3-9). As a result of employing the modifying agent, the average edge roughness improved significantly (to ~10 um or less) for 3D printed parts as retrieved from the fabrication bed (compare example 1 with comparative examples 3 and 4). This surface roughness performance is on par with that of a laser-sintered 3D part subjected to post processing.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 400° C. should be interpreted to include not only the explicitly recited limits of about 50° C. to about 400° C., but also to include individual values, such as 57° C., 95° C., 225° C., 350° C., etc., and sub-ranges, such as from about 70° C. to about 325° C., from about 60° C. to about 170° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A three-dimensional (3D) printing method, comprising:
applying a sinterable material;
heating the sinterable material to a temperature ranging from about 50° C. to about 400° C.;
selectively applying a coalescent agent on a portion of the sinterable material;
selectively applying a modifying agent on the portion, an other portion, or both the portion and the other portion of the sinterable material, the modifying agent including:
an inorganic salt;
a surfactant;
a co-solvent;
a humectant;
a biocide; and
water; and
exposing the sinterable material to radiation, whereby the coalescent agent at least partially cures the portion of the sinterable material in contact with the coalescent agent, and the modifying agent i) reduces curing of the portion of the sinterable material in contact with both the coalescent agent and the modifying agent ii) prevents curing of the other portion of the sinterable material in contact with the modifying agent, or iii) both i and ii.

2. The 3D printing method as defined in claim 1 wherein the inorganic salt has a higher melting point than a melting point of the sinterable material.

3. The 3D printing method as defined in claim 2 wherein the inorganic salt is selected from the group consisting of sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof.

4. The 3D printing method as defined in claim 1 wherein the sinterable material is applied on a contact surface, and wherein the method further comprises:
- selectively applying the coalescent agent on the portion of the sinterable material in a pattern of a cross-section of a layer of a three-dimensional object to be formed, the cross-section being parallel to the contact surface; and
- selectively applying the modifying agent on the other portion of the sinterable material at an edge boundary of at least part of the cross-section.

5. The 3D printing method as defined in claim 1 wherein the sinterable material is applied on a contact surface, and wherein the method further comprises:
- selectively applying the coalescent agent on the portion of the sinterable material in a pattern of a cross-section of a layer of a three-dimensional object to be formed, the cross-section being parallel to the contact surface; and
- selectively applying the modifying agent on at least some of the portion of the sinterable material within the cross-section.

6. The 3D printing method as defined in 1, further comprising applying the sinterable material and the modifying agent so that a volumetric ratio of a total volume of the sinterable material to a total volume of the applied modifying agent within a target region ranges from about 2:1 to about 200:1.

7. The 3D printing method as defined in claim 1, further comprising:
- making the modifying agent by mixing the inorganic salt, the surfactant, the co-solvent, the humectant, the biocide, and the water; and
- modifying an amount of the surfactant in the modifying agent to obtain a contact angle of 45° or less between the applied sinterable material and the modifying agent selectively applied thereon.

8. The 3D printing method as defined in claim 7 wherein:
- the inorganic salt is selected from the group consisting of sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof;
- the surfactant is selected from the group consisting of tetraethylene glycol; glycereth-26; a self-emulsifiable, nonionic acetylenic diol; a nonionic fluorosurfactant; and combinations thereof;
- the co-solvent is selected from the group consisting of 2-hydroxyethyl-2-pyrrolidinone, 2-pyrrolidinone, 1,6-hexanediol, and combinations thereof;
- the humectant is selected from the group consisting of Di-(2-hydroxyethyl)-5, 5-dimethylhydantoin; propylene glycol; hexylene glycol; butylene glycol; glyceryl triacetate; vinyl alcohol; neoagarobiose; glycerol; sorbitol; xylitol; maltitol; polydextrose; *quillaia;* 2-methyl-1,3-propanediol; and combinations thereof; and
- the biocide is an aqueous solution of 1,2-benzisothiazolin-3-one.

9. The 3D printing method as defined in claim 1 wherein the modifying agent includes:
- the inorganic salt present in an amount ranging from about 5.0 wt % to about 50 wt % with respect to a total weight of the modifying agent;
- the surfactant present in an amount ranging from about 0.1 wt % to about 10 wt % with respect to the total weight of the modifying agent;
- the co-solvent present in an amount ranging from about 1.0 wt % to about 20 wt % with respect to the total weight of the modifying agent;
- the humectant present in an amount ranging from about 0.1 wt % to about 15 wt % with respect to the total weight of the modifying agent;
- the biocide present in an amount ranging from about 0.01 wt % to about 5 wt % with respect to the total weight of the modifying agent; and
- a balance of the water.

10. The 3D printing method as defined in claim 1 wherein a layer of a three-dimensional object is formed after the exposing step, and wherein the method further comprises:
- applying a layer of the sinterable material on the layer of the three-dimensional object;
- heating the layer of the sinterable material to a temperature ranging from about 50° C. to about 400° C.;
- selectively applying the coalescent agent on a portion of the layer of the sinterable material;
- selectively applying the modifying agent on the portion, an other portion, or both the portion and the other portion of the layer of the sinterable material; and
- exposing the layer of the sinterable material to radiation, whereby the coalescent agent at least partially cures the portion of the layer of the sinterable material in contact with the coalescent agent, and the modifying agent i) reduces curing of the portion of the layer of the sinterable material in contact with both the coalescent agent and the modifying agent ii) prevents curing of the other portion of the layer of the sinterable material in contact with the modifying agent, or iii) both i and ii, thereby forming an other layer of the three-dimensional object.

11. The 3D printing method as defined in claim 10, further comprising repeating the applying, the heating, the selectively applying of the coalescent agent, the selectively applying of the modifying agent, and the exposing to create subsequent layers of the three-dimensional object.

12. A three-dimensional object printing kit, comprising:
- a sinterable material having a certain melting point;
- a coalescent agent including an active material, wherein the coalescent agent is to be applied to the sinterable material that is to form a 3D object; and
- a modifying agent separate from the sinterable material and the coalescent agent, wherein the modifying agent is to be applied to the sinterable material that is not to form the 3D object, and the modifying agent including:
  - an inorganic salt having a higher melting point than the certain melting point of the sinterable material;
  - a surfactant;
  - a co-solvent;
  - a humectant;
  - a biocide; and
  - water.

13. The three-dimensional object printing kit as defined in claim 12 wherein:
- the sinterable material is selected from the group consisting of polyam ides, polyethylene, polyethylene terephthalate, polystyrene, polyacetals, polyester, polycarbonate, polypropylene, thermal polyurethanes, and blends of these polymers;
- the active material is carbon black; and
- the inorganic salt is selected from the group consisting of sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof.

14. The three-dimensional object printing kit as defined in claim 12 wherein:
the inorganic salt is present in an amount ranging from about 5.0 wt % to about 50 wt % with respect to a total weight of the modifying agent, and is selected from the group consisting of sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof;
the surfactant is present in an amount ranging from about 0.1 wt % to about 10 wt % with respect to the total weight of the modifying agent, and is selected from the group consisting of tetraethylene glycol; glycereth-26; a self-emulsifiable, nonionic acetylenic diol; a nonionic fluorosurfactant; and combinations thereof;
the co-solvent is present in an amount ranging from about 1.0 wt % to about 20 wt % with respect to the total weight of the modifying agent, and is selected from the group consisting of 2-hydroxyethyl-2-pyrrolidinone, 2-pyrrolidinone, 1,6-hexanediol, and combinations thereof;
the humectant is present in an amount ranging from about 0.1 wt % to about 15 wt % with respect to the total weight of the modifying agent, and is selected from the group consisting of Di-(2-hydroxyethyl)-5, 5-dimethylhydantoin; propylene glycol; hexylene glycol; butylene glycol; glyceryl triacetate; vinyl alcohol; neoagarobiose; glycerol; sorbitol; xylitol; maltitol; polydextrose; *quillaia;* 2-methyl-1,3-propanediol; and combinations thereof;
the biocide is present in an amount ranging from about 0.01 wt % to about 5 wt % with respect to the total weight of the modifying agent, and is an aqueous solution of 1,2-benzisothiazolin-3-one; and
water makes up a balance of the modifying agent.

15. The three-dimensional object printing kit as defined in claim 12 wherein the sinterable material includes a plurality of polymer particles, the plurality of polymer particles including:
a first polymer particle having an average size greater than 50 µm, and being present in an amount ranging from about 70 wt % to about 95 wt %;
a second polymer particle having an average size ranging from about 10 µm to about 30 µm, and being present in an amount ranging from about 0.5 wt % to about 21 wt %; and
a third polymer particle having an average size equal to or less than 10 µm, and being present in an amount ranging from greater than 0 wt % up to about 21 wt %;
wherein a melting point of at least one of the first, second, or third polymer particles is the certain melting point.

16. The three-dimensional object printing kit as defined in claim 12 wherein the sinterable material includes a charging agent selected from the group consisting of behentrimonium chloride, cocamidopropyl betaine, and a combination thereof.

17. The three-dimensional object printing kit as defined in claim 12 wherein the sinterable material includes a flow aid selected from the group consisting of magnesium stearate, sodium bicarbonate, sodium ferrocyanide, potassium ferrocyanide, calcium ferrocyanide, bone phosphate, talcum powder, sodium aluminosilicate, potassium aluminium silicate, calcium aluminosilicate, polydimethylsiloxane, and a combination thereof.

18. A three-dimensional object printing kit, comprising:
a sinterable material having a certain melting point;
a coalescent agent including an active material, wherein the coalescent agent is to be applied to the sinterable material that is to form a 3D object; and
a modifying agent to be applied to the sinterable material that is not to form the 3D object, the modifying agent consisting of:
an inorganic salt having a higher melting point than the certain melting point of the sinterable material;
a surfactant;
a co-solvent;
a humectant;
a biocide; and
water.

* * * * *

UNITED STATES PATENT AND TRADEMARK OFFICE
CERTIFICATE OF CORRECTION

PATENT NO. : 10,434,708 B2
APPLICATION NO. : 15/121730
DATED : October 8, 2019
INVENTOR(S) : Howard S. Tom et al.

Page 1 of 1

It is certified that error appears in the above-identified patent and that said Letters Patent is hereby corrected as shown below:

In the Claims

In Column 15, Line 22, in Claim 6, delete "1," and insert -- claim 1, --, therefor.

In Column 16, Line 61, in Claim 13, delete "polyam ides," and insert -- polyamides, --, therefor.

Signed and Sealed this
Thirty-first Day of December, 2019

Andrei Iancu
*Director of the United States Patent and Trademark Office*